Patented May 10, 1927.

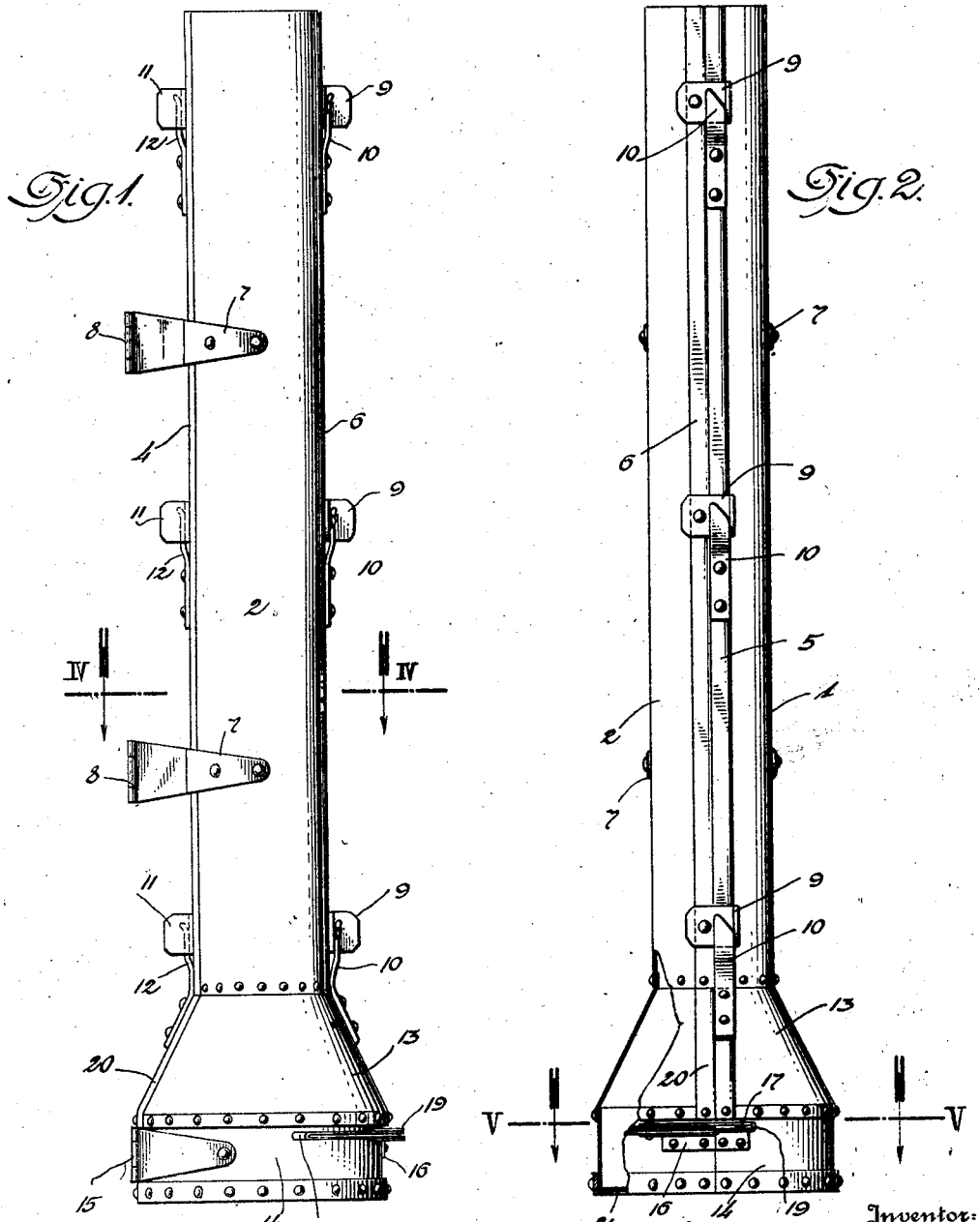

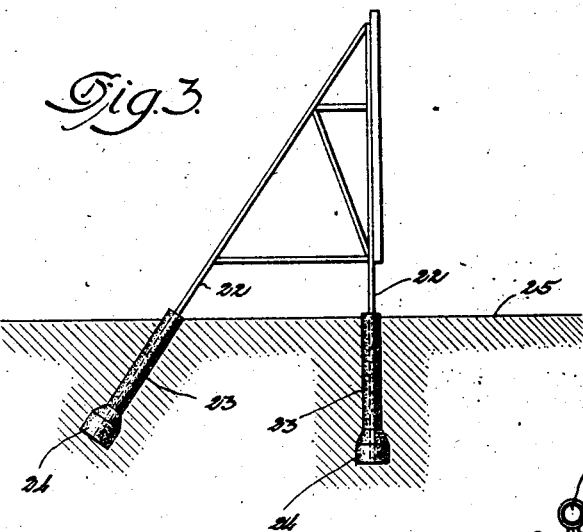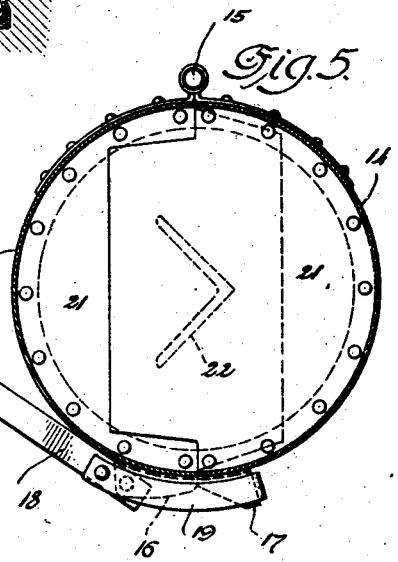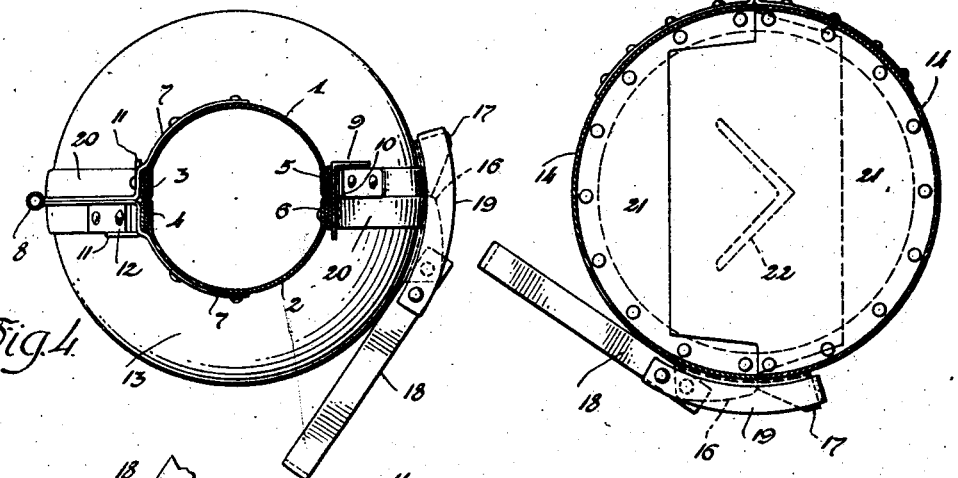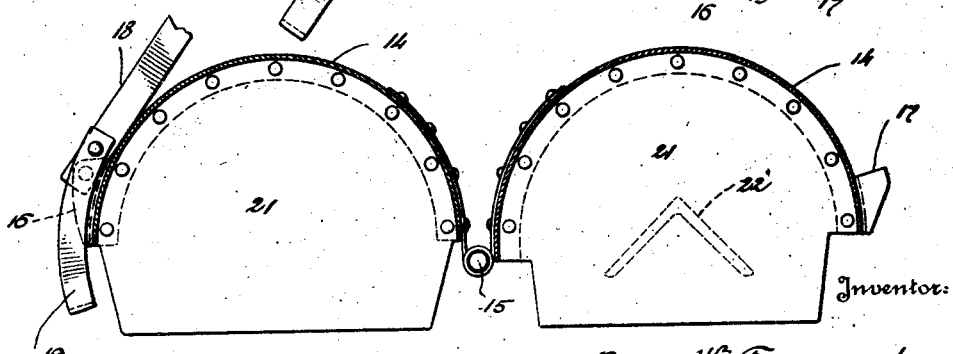

1,627,754

UNITED STATES PATENT OFFICE.

OTTO H. TOWNSEND, OF DETROIT, MICHIGAN, ASSIGNOR TO WALKER & CO., OF DETROIT, MICHIGAN, A CORPORATION OF MICHIGAN.

MOLD FOR FOOTINGS.

Application filed March 8, 1926. Serial No. 93,118.

The erection of large signs on lots, along streets and highways, necessitates a metallic framework and to anchor and protect that part of the framework in or on the ground footings, piers or foundation structures are used and made from concrete or other plastic material that may be economically and expeditiously molded.

This invention aims to provide a novel metallic mold for easily and quickly shaping concrete or other plastic material to form a footing or anchorage for those parts of a sign structure which enter the ground. The mold is made of two hingedly connected parts that may be easily and quickly manipulated to provide a structure adapted to receive concrete, and novel means is employed for holding the hinged parts of the mold in a closed position against accidental displacement during the pouring of concrete.

Reference will now be had to the drawings, wherein—

Figure 1 is a side elevation of a mold for producing a footing in accordance with this invention;

Fig. 2 is a front elevation of the same partly broken away and partly in section;

Fig. 3 is an end view of a sign having footings molded in accordance with this invention;

Fig. 4 is a horizontal sectional view taken on the line IV—IV of Fig. 1;

Fig. 5 is a similar view taken on the line V—V of Fig. 2, and

Fig. 6 is a similar view showing the mold in an open position.

The greater part of the mold is composed of two opposed semi-cylindrical sections 1 and 2 having longitudinal edges thereof provided with return bends forming rear ribs 3 and 4 and front ribs 5 and 6.

Secured to the mold sections 1 and 2 by rivets or other fastening means are the long straps 7 of leaf hinges 8.

Pivotally mounted on the front ribs 6 are angle latches 9 adapted to be placed in engagement with off-set keepers 10 carried by the front rib 5. The rear rib 3 has latches 11 for engagement with keepers 12 on the rear rib 4, said latches and keepers constituting means, spaced longitudinally of the hingedly connected mold sections 1 and 2 for holding said sections in a closed position, as shown in Fig. 4, to form a cylindrical mold structure.

Riveted or otherwise connected to the lower end of each mold section is a flared filler section 13 and riveted or otherwise connected to each filler section is a semi-cylindrical base section 14. The base sections 14 are connected by a hinge 15 having its pintle in longitudinal alinement with the pintles of the hinges, so that the mold may be opened as shown in Fig. 6. Holding the base sections of the mold close, as shown in Figs. 4 and 5 is a clamping device comprising a bearing 16 on one base section, a block 17 on the other base section, a lever 18 pivotally connected to the bearing 16, and a yoke 19 pivotally connected to the lever 18 and adapted to engage over the block 17. The bearing 16 and the block 17 are adapted to be brought into abutting relation and the lever 18 is used to clamp the yoke 19 on the block 17 so that the mold sections will be held in a closed position.

The filler sections 13 have ribs 20 as a continuation of the front and rear ribs of the mold sections 1 and 2, and the base sections 14 have bottom walls or plates 21 adapted for overlapped relation, as shown in Fig. 5, to form a substantial bottom wall for the mold, which is adapted to be filled with concrete or other plastic material. Before filling the mold the sign upright, brace or other member 22 is placed axially of the closed mold and the concrete or plastic material poured about the sign member to harden or season and form a footing 23 having a base or head 24 which anchors the footing in the ground 25. The footing 23 protects the ground end of the sign member and affords a substantial anchorage for the same in the ground.

Suitable spacing members or anchoring devices can be employed for temporarily holding the sign member in the mold during a concrete pouring operation. I have deemed it unnecessary to show such a device as it forms no part of my invention.

One embodiment of my invention has been illustrated, but it is to be understood that the structural elements are susceptible to such variations and modifications as fall within the scope of the appended claim.

What I claim is:—

A mold of the type described, comprising semi-cylindrical, filler and base sections having bottom walls, hinges connecting said base sections, hinges connecting said semi-cylindrical sections, and alining with the hinges of said base sections, said filler sections connecting said semi-cylindrical sections to said base sections, and latches and keepers adapted to hold said sections closed to receive plastic material.

In testimony whereof I affix my signature.

OTTO H. TOWNSEND.